United States Patent

Agree et al.

[11] Patent Number: 5,562,833
[45] Date of Patent: Oct. 8, 1996

[54] DUAL FEED PAINT DETACKIFICATION PROGRAM

[75] Inventors: Howard B. Agree, Newtown; Robert A. Iezzi, Malvern, both of Pa.

[73] Assignee: Betz Laboratories, Inc., Trevose, Pa.

[21] Appl. No.: 383,160

[22] Filed: Feb. 3, 1995

[51] Int. Cl.$^6$ ........................... C02F 1/56
[52] U.S. Cl. .................. 210/712; 95/152; 95/195; 210/728; 210/736; 210/930; 134/38
[58] Field of Search ............ 95/152, 195; 210/705, 210/712, 725, 727, 728, 735, 736, 930; 134/38; 427/331

[56] References Cited

U.S. PATENT DOCUMENTS

| | | | |
|---|---|---|---|
| 3,990,869 | 11/1976 | Forney | 55/19 |
| 4,067,806 | 1/1978 | Mauceri | 210/52 |
| 4,440,647 | 4/1984 | Puchalski | 210/712 |
| 4,637,824 | 1/1987 | Pominville | 55/85 |
| 4,800,039 | 1/1989 | Hassick et al. | 252/181 |
| 4,853,132 | 8/1989 | Merrell et al. | 210/712 |
| 4,937,003 | 6/1990 | Merrell | 210/712 |
| 4,954,220 | 9/1990 | Rushmere | 162/168.3 |
| 5,015,391 | 5/1991 | Mohn | 210/708 |
| 5,060,682 | 10/1991 | Merrell | 134/38 |
| 5,143,624 | 9/1992 | Morse | 210/712 |
| 5,147,558 | 9/1992 | Purnell | 210/712 |
| 5,240,509 | 8/1993 | Rey et al. | 134/38 |
| 5,250,189 | 10/1993 | Rey | 210/712 |
| 5,250,190 | 10/1993 | Kassouf et al. | 210/712 |

*Primary Examiner*—Peter A. Hruskoci
*Attorney, Agent, or Firm*—Alexander D. Ricci; Steven D. Boyd

[57] ABSTRACT

In a paint spray booth wherein water is used to collect oversprayed paint, a process is disclosed for detackifying and coagulating oversprayed paint by the independent and concurrent addition of specific amounts of specific anions and cationic polymers to the water system.

2 Claims, No Drawings

DUAL FEED PAINT DETACKIFICATION PROGRAM

FIELD OF THE INVENTION

The present invention relates to an improved method for treating paint wastes and paint oversprays encountered in wet paint spray booths or any areas where these oversprays exist. More particularly, the present invention relates to an improved method for treating wastes and oversprays in paint spray booths where a combination of inorganic anions and cationic polymers are employed to detackify paint.

BACKGROUND OF THE INVENTION

The spray painting of automobile bodies, truck engines, appliances, and other industrial goods is customarily carried out in enclosed areas called paint spray booths (PSB). These booths act to contain any fumes or oversprayed paint, to reduce the chances of airborne contamination and to protect the painters from these hazards. These booths vary in size, but are somewhat basic in their design and operation. A typical booth would thus consist of a work area, back section with mist eliminators and a sump.

The units to be painted generally pass through the work area while an air flow makes the oversprayed paint contact either the sump water or the spray from a water curtain. The air is scrubbed with recirculated water at the water curtain, passes through mist eliminators and is removed by an exhaust fan.

Even though paint transfer efficiencies have increased through improved application technologies, roughly one-half of all paint sprayed does not reach its intended article. As a result, a significant concentration of paint builds up in the system and agglomeration can occur. The resultant mass is a sticky, tacky material, which can plug the mist eliminators, shower heads, and even recirculating pumps. When this happens, scrubbing efficiency decreases, leading to potentially hazardous conditions of unchecked paint emissions being discharged into the atmosphere. Such conditions may also present severe safety hazards to paint spray booth operators.

This process involves other problems. These tacky organic deposits are subject to bacterial growth and fungi proliferation, which conditions generate corrosion and odor problems. In addition, the paint solids that are recirculated can form suspensions in the water. They remain tacky and can create expensive separation and disposal problems.

These problems show, therefore, the desirability to treat PSB water systems so as to reduce or prevent as much as possible the agglomeration and deposition of oversprayed paint on critical PSB operation parts, to render the resultant sludge non-tacky and easily removable and to provide a water quality such that it can be recycled for use in the system.

Another problem associated with paint detackification and separation from the paint spray booth water wash system is the disposal cost associated with removal of the resulting paint sludge. For economic reasons, it is highly desirable to provide a PSB chemical treatment that results in a high solids (low moisture) sludge with a reduced or low volume sludge so that disposal costs may accordingly be minimized.

RELATED ART

The use of a precipitate formed by the combined use of certain inorganic anions and cationic polymers to detackify and condition overspray paint is disclosed in U.S. Pat. No. 4,853,132. This patent described a process for detackifying and coagulating paint, lacquer, or enamel in spray booths in which water is used to wash air. The process comprises the steps of adding a water soluble cationic polymer in combination with a water soluble salt of an inorganic anion. The anion reacts with the polymer to produce a precipitate which in turn detackifies and coagulates the paint, lacquer or enamel to provide a paint sludge that is high in solids and low in volume.

U.S. Pat. No. 5,147,558 discloses a process for detackifying and coagulating oversprayed paint by addition of specific amounts of specific anions and cationic polymers blended prior to addition to the spray booth water system.

U.S. Pat. No. 5,250,190 discloses a method of detackifying and coagulating overspray in a paint spray booth using water to collect overspray in which specific cationic polymers are added to a water stream, blended and thereafter an anionic activator is added to the stream. Thereafter, the stream is added to the paint spray booth water system.

SUMMARY OF THE INVENTION

The present inventors discovered an improved method of feeding a combination of a cationic polymer and an inorganic anionic activator to a wet paint spray booth water system. The combination is effective at detackifying and coagulating paint, lacquer or enamel in paint spray booths in which water is used to wash air inside the booths. More particularly, the present invention comprises an improved process for detackifying and coagulating the paint, lacquer or enamel in paint spray booths in which water is used to wash air in the booth and to remove oversprayed materials and wherein the water is recirculated for further washing of the air in the paint spray booth. The process of the present invention comprises adding independently and concurrently a concentrate of a cationic polymer and an anionic activator to paint spray booth water. The treatment is added to paint spray booth water to detackify and coagulate the paint, lacquer or enamel in order to provide a paint sludge that is high in solids and low in volume.

It was discovered that the independent and concurrent addition of the cationic polymer and the inorganic activator to a paint spray booth water system provides good paint detackification and enhanced flotation of paint solids. Further, the independent and concurrent addition allows for rapid and easy adjustments in the polymer to activator ratio. Changes in polymer to activator ratio may be desirable to control system upsets, changes in paint, or changes in other chemicals added to the paint spray booth system. The efficacy of the present process allows for a decrease in polymer and activator feed rates while providing improved detackification.

The independent and concurrent feeding of the polymer and activator to a paint spray booth water system allows for accurate control of the polymer to activator ratio. Control of the polymer to activator ratio is important to avoid the formation of an undesirable floc at low concentrations of polymer and activator or the formation of a gel at high concentrations of polymer and activator.

DETAILED DESCRIPTION OF THE INVENTION

The present invention provides an improved paint spray booth detackification program which effectively detackifies paint, provides a paint sludge that is high in solids and low in volume, which program is easily controlled.

In accordance with the present invention, it has been discovered that a paint spray booth treatment which comprises the use of specific inorganic anion activators in conjunction with cationic polymers is improved by the independent and concurrent addition of concentrates of the anion activator and a cationic polymer to the spray booth water system.

It has been disclosed in U.S. Pat. No. 4,853,132, hereby incorporated by reference, that the use of specific inorganic anions such as silicates, when combined with cationic polymers provides an improved composition and method for the detackification of paint wastes in a paint spray booth environment. According to this system, a selected inorganic anion and a cationic polymer are separately added to the recirculating wash water in the spray booth. In the water, the anion "activates" the polymer to form a precipitate which is responsible for detackification of the paint particles. Upon detackification, the anion is released from the cationic polymer, thereupon making it available for further activation of additional cationic polymers.

In accordance with the present invention, it has been discovered that the independent and concurrent addition of certain anions with specific cationic polymers to the wash water of a spray booth results in a more effective "kill" and flotation of paint solids in the system. The anion and cationic polymers are added in an easily varied ratio sufficient to provide optimum paint detackification under changing conditions.

The anion of the present invention is provided by an aqueous solution of the salt aluminum chlorohydrate. The cationic polymer of the present invention is a condensation product of hexamethylenediamine still bottoms plus ethylene dichloride, such as Monsanto Santofloc F.

In the practice of the present invention, an aqueous solution of the inorganic anion, provided by the salt aluminum chlorohydrate, and an aqueous solution of the cationic polymer are added independently and concurrently to paint spray booth recirculating water before the introduction of the overspray paint. The components can be fed directly to the paint spray booth header or through some type of in-line mixing apparatus. The components can be admitted to the paint spray booth system at varied locations including: the pump, upstream from the pump, or at any advantageous position along the circulating water system.

The components are either shot fed or continuously fed to the paint spray booth water system. In general, the inorganic anion treatment level would be in the range of 0.01 to 15% anion, based on oversprayed paint (BOP). Although the cationic polymer treatment level is dependent on many factors such as paint type, water chemistry, etc., the operable dosage rate of the cationic polymer will generally be in the range of 0.01 to 10% active polymer, based on oversprayed paint. Preferably the inorganic anions are added within the range of 0.05 to 10% anion, based on overspray paint and the cationic polymer is added within the range of 0.05 to 5% active polymer, based on overspray paint.

Generally, the ratio of anion to cationic polymer will be from about 0.25:10 to about 10:1, by weight. The preferred range is from 0.25:1 to 5:1. In the practice of the present invention it is not necessary to determine a single blend ratio of anion to cationic polymer. The anion/cationic polymer ratio can be easily varied "on-line".

Paint as used herein, is a broad based term to describe the coating applied to a given object. Paints are normally composed of a film former (the resin which forms the coating), a solvent or carrier (water or organic), pigments (for color) and additives such as biocides, drying agents, viscosity modifiers, etc. In general, the solvent is used to classify the paint type: either water based or oil based. Technically, if the paint forms its coating by evaporation of the solvent without chemical reaction, it is a lacquer. If the coating is formed via crosslinking, it is an enamel.

EXAMPLES

A standard jar test procedure was employed to determine the efficacy of the process of the present invention in relation to a premixed blend of anion/cationic polymer. Testing was undertaken with a variety of solventborne and waterborne paints. The general procedure used was to add 100 ml of tap water to a 120 ml jar. The treatment components were added independently and concurrently and the jar capped and shaken to mix the contents and coat the internal surfaces of the jar with the treated water. One ml of paint was added to the jar. After vigorous shaking for 30 seconds, a wooden tongue depressor was immersed in the solution and then removed for examination. The following guidelines were used for examining the detackification performance of the treatment.

| Rating | Definition |
|---|---|
| 1 | Paint forms large tacky globules and/or coating which adheres to the exposed surfaces of the jar and tongue depressor. |
| 2 | Paint forms agglomerates which are slightly tacky to touch, or upon crushing. Paint sludge coats the tongue depressor |
| 3 | Paint forms granular flocs which adhere to less than 10% of the exposed surface area of the jar or depressor. Sludge may be smeary, but not tacky. |
| 4 | Paint forms particles, some of which appear as specks on less than 1% of the exposed surface area of the jar or depressor. Sludge is neither smeary nor tacky. |
| 5 | Paint forms particles which do not adhere to the exposed surfaces of the jar or depressor. The paint sludge may float, sink or be dispersed in the water. |

Jar tests were performed to determine the efficacies of preblending and independent/concurrent addition of an aluminum chlorohydrate copolymer combination with a variety of solventborne and waterborne paints. Tables I through III show that with the independent/concurrent feed, paint detackification is equal to premixing while flotation of the paint solids is unexpectedly enhanced. Table IV shows that comparable results are obtained when Silicate D (Silicate D is a 2:1 ratio of silica to sodium oxide) is added. The Silicate D was shot fed prior to the addition of the anion/cationic polymer. The data in Tables I and II shows that the percent flotation is enhanced with smaller treatment combination particle size.

TABLE I

Solventborne BASF Basecoat

| Sample | Aluminum Chlorohydrate (ppm) | Copolymer | Kill | Amount of Flotation | Median Particle Size (μm) |
|---|---|---|---|---|---|
| I | 400 | 400 | 4+ | 90% solids floated | 1.98 |
| II | Premix of Sample I | | 4+ | 75% solids floated | 2.28 |
| III | 250 | 250 | 4 | 90% solids floated | |
| IV | Premix of Sample III | | 3+/4− | 75% solids floated | |

TABLE II

Waterborne PPG Primer

| Sample | Aluminum Chlorohydrate (ppm) | Co-polymer | Kill | Amount of Flotation | Median Particle Size (μm) |
|---|---|---|---|---|---|
| V | 400 | 400 | 4+ | 95% floated | 1.98 |
| VI | Premix of Sample V | | 4+ | 75% floated | 2.28 |

TABLE III

Waterborne DuPont Primer

| Sample | Aluminum Chlorohydrate (ppm) | Copolymer | Kill | Amount of Flotation |
|---|---|---|---|---|
| VII | 700 | 700 | 4+ | 75% floated |
| VIII | Premix of Sample VII (same concentration) | | 4+ | 50% floated |

TABLE IV

Solventborne PPG Basecoat

| Sample | Aluminum Chlorohydrate (ppm) | Copolymer | Silicate D (ppm) | Kill | Amount of rotation |
|---|---|---|---|---|---|
| IX | 900 | 900 | 2400 | 4+ | 100% floated |
| X | Premix of Sample IX | | 2400 | 4 4+ | 75% floated |
| XI | 900 | 900 | 2000 | 4 4+ | 100% floated |
| XII | Premix of Sample XI | | 2000 | 4 4+ | 75% floated |

While the present invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

What is claimed is:

1. A process for detackifying and coagulating paint, lacquer or enamel in spray booths in which water is used to wash air in said booth and to remove oversprayed paints, enamels, or lacquers in which a water soluble or water dispersible condensation product of hexamethylenediamine still bottoms and ethylene dichloride in combination with aluminum chlorohydrate is added to said water wherein the improvement comprises adding from 0.01 to 10%, based on oversprayed paint of said condensation product of hexamethylenediamine still bottoms and ethylene dichloride and aluminum chlorohydrate in a ratio of from about 0.25:10 to about 10:1 to said water independently and concurrently, to form a non-tacky paint sludge, and removing said paint sludge from said water by flotation.

2. The process of claim 1 wherein silica and sodium oxide in a ratio of 2:1 is added to said water.

* * * * *